(12) United States Patent
Fraser

(10) Patent No.: US 7,681,265 B2
(45) Date of Patent: Mar. 23, 2010

(54) CELLULAR CUSHION

(75) Inventor: Kevin Gerard Fraser, Belleville, IL (US)

(73) Assignee: Star Cushion Products, Inc., Freeburg, IL (US)

( * ) Notice: Subject to any disclaimer, the term of this patent is extended or adjusted under 35 U.S.C. 154(b) by 0 days.

(21) Appl. No.: 12/060,677

(22) Filed: Apr. 1, 2008

(65) Prior Publication Data

US 2008/0196166 A1     Aug. 21, 2008

Related U.S. Application Data

(63) Continuation-in-part of application No. 11/179,859, filed on Jul. 12, 2005, now Pat. No. 7,350,251.

(51) Int. Cl.
*A47C 27/18* (2006.01)
(52) U.S. Cl. .................................. 5/654; 5/653; 5/657
(58) Field of Classification Search ............ 5/653–654, 5/655.3, 657, 710
See application file for complete search history.

(56) References Cited

U.S. PATENT DOCUMENTS

| | | | |
|---|---|---|---|
| 4,698,864 A | 10/1987 | Graebe | |
| 5,052,068 A * | 10/1991 | Graebe | 5/654 |
| 5,163,196 A | 11/1992 | Graebe et al. | |
| D386,035 S | 11/1997 | Matsler et al. | |
| 5,689,845 A | 11/1997 | Sobieralski | |
| D389,692 S | 1/1998 | Graebe et al. | |
| D389,702 S | 1/1998 | Graebe et al. | |
| D391,110 S * | 2/1998 | Graebe et al. | D6/601 |
| 5,845,352 A | 12/1998 | Matsler et al. | |
| 6,095,611 A | 8/2000 | Bar et al. | |
| 6,165,142 A | 12/2000 | Bar | |
| D439,098 S | 3/2001 | Matsler et al. | |
| 6,256,819 B1 * | 7/2001 | Maier et al. | 5/653 |
| D463,701 S | 10/2002 | Borcherding et al. | |
| 6,564,410 B2 | 5/2003 | Graebe et al. | |
| 6,623,080 B2 | 9/2003 | Clapper | |
| 6,687,936 B2 | 2/2004 | Graebe et al. | |
| 6,901,617 B2 * | 6/2005 | Sprouse et al. | 5/654 |
| 7,409,735 B2 | 8/2008 | Kramer et al. | |

* cited by examiner

*Primary Examiner*—Fredrick Conley
(74) *Attorney, Agent, or Firm*—Armstrong Teasdale LLP

(57) ABSTRACT

A cellular cushion includes a base and a plurality of hollow cells coupled to the base. The base includes at least a first layer and a second layer. The first layer includes a substantially planar lower surface and an opposite upper surface. The second layer includes a substantially planar lower surface and an opposite substantially planar upper surface. The hollow cells extend outwardly from the first layer upper surface within at least one region. Each of the cells within the first region are coupled together in flow communication. Each of the cells includes a hollow body portion and an outer surface. The cells are spaced across the base such that the cell outer surfaces cooperate to define a contoured seat configured to cradle a portion of a user. An outer surface of at least some of the cells is at least one of oriented obliquely with respect to the base.

17 Claims, 3 Drawing Sheets

CELLULAR CUSHION

CROSS REFERENCE TO RELATED APPLICATION

This application is a continuation-in-part of U.S. patent application Ser. No. 11/179,859 filed Jul. 12, 2005, and now issued as U.S. Pat. No. 7,350,251.

BACKGROUND OF THE INVENTION

This invention relates generally to cellular cushions, and more particularly, to cellular cushions used with seats.

The sport of motorcycling has grown to epic proportions, and is continuing to grow in popularity, as evidenced by, for example, the growing number of television programs dedicated to motorcycles and the steady annual increase of motorcycle sales. A typical motorcycle ride may last for several hours, or very often several days, covering hundreds of miles. Despite the smoothness of the pavement and the motorcycle suspension, the motorcycle operator may still be subjected to vibrational stresses induced through the seat. Over time, the vibrations may lead to discomfort and fatigue.

Known seats for vehicles, such as motorcycles, usually have a supporting base layer, a cushion layer, and an exterior cover layer. Traditionally, a molded cushion is formed on the base layer and a cover is stitched and fitted over the cushion. To facilitate alleviating the effects of vibrational forces induced to the operator through the seat, at least some known motorcycle seats include additional padding within the seat. However, over time, because the operator of a motorcycle is primarily in a seated position for extended periods of time, the padding in such seats may bottom out and the operator's weight may undesirably become concentrated in the bonier portions of the individual's buttocks. As such, known motorcycle seats do not facilitate distributing an operator's weight across the individual's buttocks.

BRIEF DESCRIPTION OF THE INVENTION

In one aspect, a cellular cushion is provided. The cellular cushion includes a base and a plurality of hollow cells coupled to the base. The base includes at least a first layer and a second layer. The first layer includes a substantially planar lower surface and an upper surface that is opposite the lower surface. The second layer includes a substantially planar lower surface and a substantially planar upper surface that is opposite the second layer lower surface. The plurality of hollow cells extend outwardly from the first layer upper surface within at least one region. Each of the plurality of cells within each region are coupled together in flow communication. Each of the plurality of cells comprises a hollow body portion and an outer surface. The plurality of cells are spaced across the base such that the plurality of cell outer surfaces cooperate to define a contoured seat configured to cradle a portion of a user. An outer surface of at least some of the plurality of cells is at least one of oriented obliquely with respect to the base and is non-planar.

In another aspect, a cellular cushion including a base and a plurality of hollow cells coupled to the base is provided. The base includes at least a first layer and a second layer. The first layer includes a substantially planar lower surface and an upper surface that is opposite the lower surface. The second layer includes a substantially planar lower surface and a substantially planar upper surface that is opposite the second layer lower surface. The plurality of hollow cells extend outwardly from the first layer upper surface within at least one region. Each of the plurality of cells within the at least one region are coupled together in flow communication only with cells within that region. Each of the plurality of cells includes a hollow body portion and an outer surface. The plurality of cells are spaced across the base such that the plurality of cell outer surfaces cooperate to define a contoured seat that is configured to cradle a portion of a user. An outer surface of at least some of the plurality of cells is at least one of oriented obliquely with respect to the base and is non-planar. At least some of the plurality of cell outer surfaces are sloped in a first direction and at least some of the plurality of cell outer surfaces are sloped in a second direction that is opposite the first direction. At least some of the hollow cells in the at least one region have a non-circular cross-sectional profile.

In a further aspect, a cellular cushion including base, a plurality of first hollow cells extending outwardly from the base, and a plurality of second hollow cells extending outwardly from the base is provided. The base has a substantially planar lower surface and a substantially planar upper surface that is opposite the lower surface. The plurality of first hollow cells extending outward from the base within the first region. The plurality of second hollow cells extending outward from the base within the second region. The plurality of first hollow cells in the first region are coupled together in flow communication independently of the plurality of second hollow cells within the second region. Each of the first and second hollow cells includes a hollow body portion extending from the base to an outer surface. At least some of the cell outer surfaces are oriented obliquely with respect to the base and are sloped in a first direction. At least some of the cell outer surfaces are oriented obliquely with respect to the base and are sloped in a second direction that is substantially opposite the first direction. At least some of the plurality of first and second plurality have a non-circular cross-sectional shape.

DETAILED DESCRIPTION OF THE INVENTION

Figure 1:
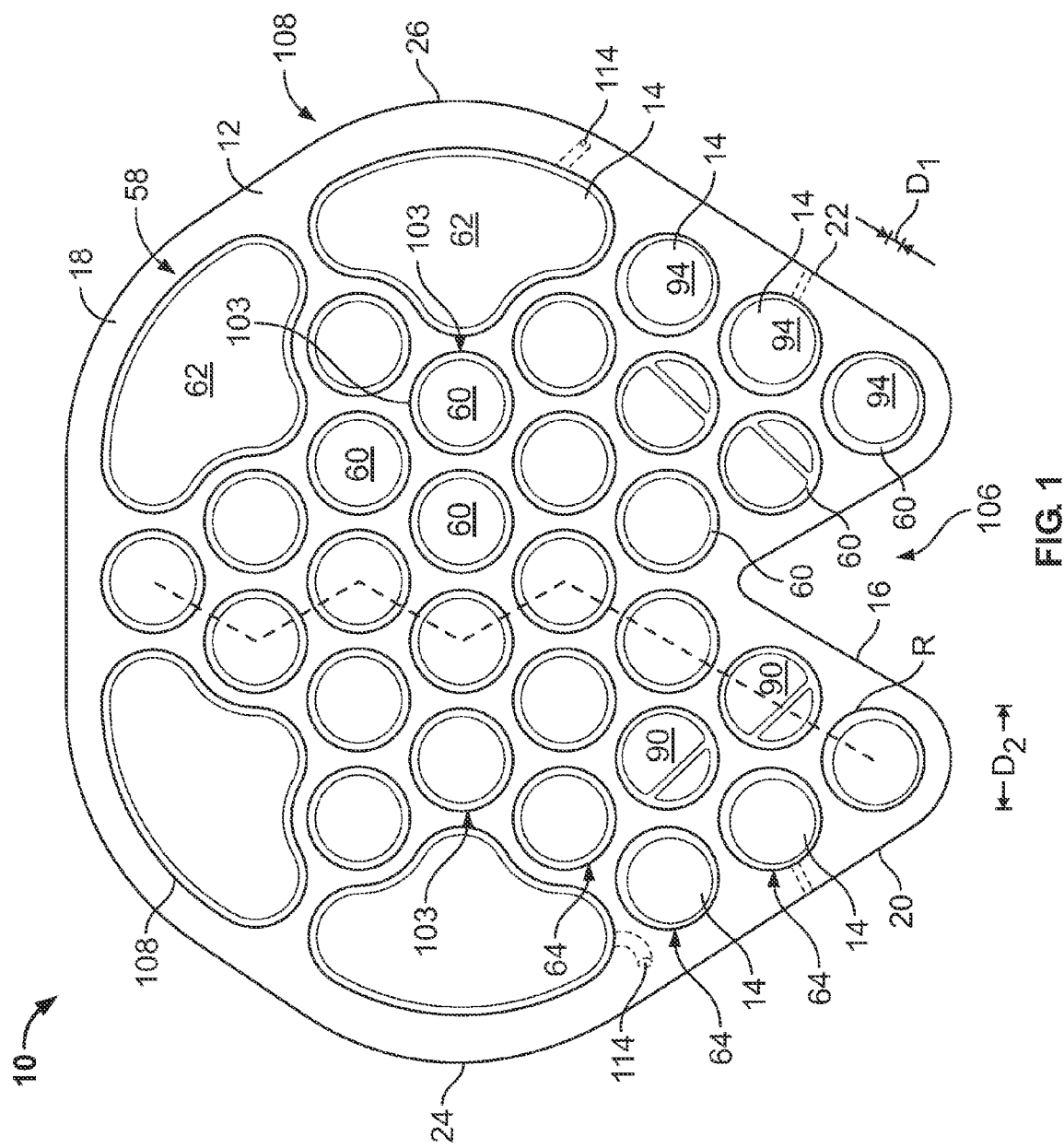
FIG. 1 is a plan view of an exemplary cellular cushion.
Figure 2:
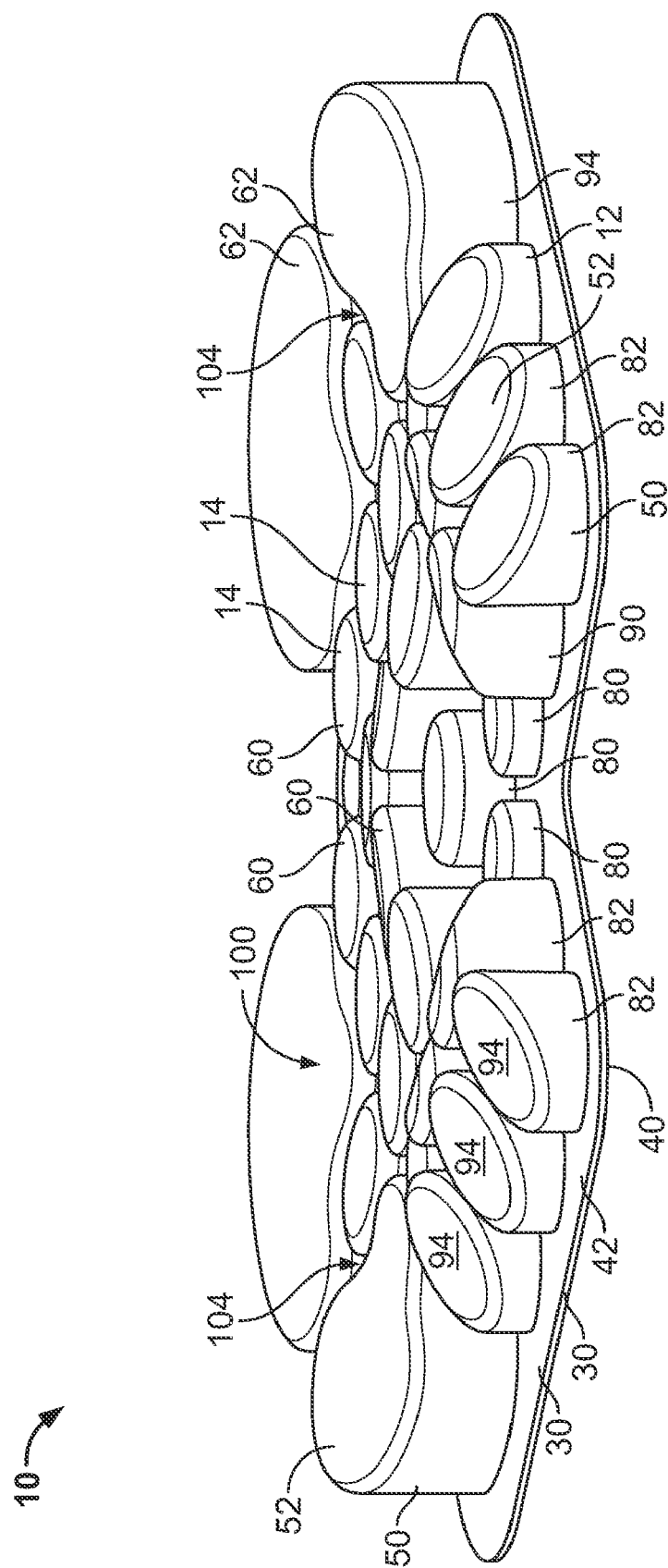
FIG. 2 is a front perspective view of the cellular cushion shown in FIG. 1.
Figure 3:
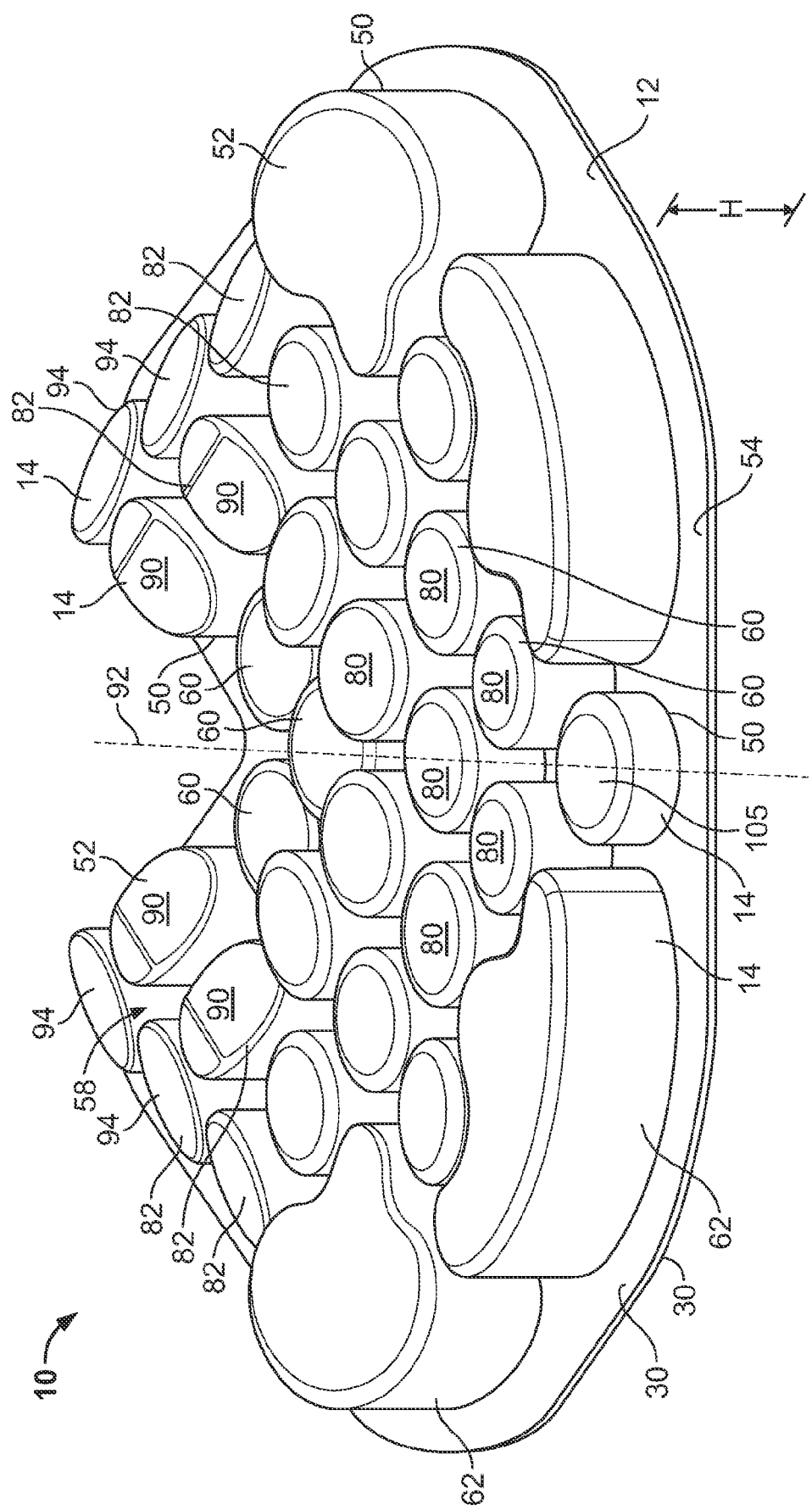
FIG. 3 is a rear perspective view of the cellular cushion shown in FIG. 1.

FIG. 1 is a plan view of an exemplary cellular cushion 10. FIG. 2 is a front perspective view of cellular cushion 10. FIG. 3 is a rear perspective view of cushion 10. Cushion 10 is flexible and as described herein, is configured for use as an underlying support surface, such as, but not limited to, with a vehicle seat for use with, for example, a motorcycle, a bicycle, and/or a tractor, or for use within an office chair. Moreover, cushion 10 may be used as a back rest for use with a seat. In the exemplary embodiment, cushion 10 is shaped for use with a motorcycle seat. Cushion 10 is intended as exemplary only, and thus is not intended to limit in any way the definition and/or meaning of the terms "cushion" or "seat". Furthermore, although the invention is described herein in association with a cushion for a vehicle, and more specifically for use with a cushion for a motorcycle seat, it should be understood that the present invention is applicable to other cushion designs, as well as other cellular cushions. Accordingly, practice of the present invention is not limited to cellular cushions for motorcycle seats.

Cushion 10 includes a base 12 and a plurality of hollow cells 14 extending outwardly from base 12. In the exemplary embodiment, base 12 includes a forward side 16 and a rear side 18 connected together by a pair of opposing sides 20 and 22. More specifically, in the exemplary embodiment, cushion sides 20 and 22 extend outwardly from cushion forward side 16 to a respective elbow 24 and 26, and rear side 18 extends arcuately between elbows 24 and 26. In an alternative embodiment, base 12 may be any shape depending on the intended use of cushion 10.

In the exemplary embodiment, base 12 is flexible and is formed from a plurality of layers 30 that are coupled together. In one embodiment, base 12 and cells 14 are formed from a flexible neoprene. Alternatively, base 12 and cells 14 are formed from any material that enables cellular cushion 10 to function as described herein. In the exemplary embodiment, a lower layer 40 and an outer or conformal layer 42 are bonded together to form base 12, as described in more detail herein. Alternatively, base 12 may include any number of layers 30 depending on the desired application of cellular cushion 10. For example, in an alternative embodiment, base 12 may include at least three layers 30 wherein at least one of the layers 30 is fabricated from a material that prevents that specific layer 30 from bonding against the other layers. Moreover, in other alternative embodiments, base 12 includes more than three layers 30.

In the exemplary embodiment, each cell 14 includes a body portion 50 and an outer surface 52 that is formed integrally with body portion 50. Each cell 14 is hollow and has a defined volume therein. Furthermore, each cell 14 has a height H measured between an upper surface 54 of base 12 and cell outer surface 52. Moreover, and as described in more detail below, in the exemplary embodiment, outer layer 42 is formed integrally with cells 14. Alternatively, cells 14 may be formed integrally with lower layer 40 or any other layer 30 within base 12. In a further alternative embodiment, cells 14 are coupled to base 12 using any known coupling method, such as, but not limited to, through an adhesive process or a radio frequency (RF) welding process.

In the exemplary embodiment, conformal layer 42 is formed unitarily with cells 14 such that cells 14, as described in more detail below, are oriented within an arrangement 58 of air cells 14. In alternative embodiments, cells 14 are arranged in other geometric arrangements. In the exemplary embodiment, cell arrangement 58 is symmetrical and includes a plurality of inner support or small cells 60 and a plurality of outer support or large cells 62. In other embodiments, arrangement 58 is non-symmetrical. In the exemplary embodiment, cells 60 are positioned substantially symmetrically across conformal layer 42 within cell arrangement 58, such that adjacent cells 60 are separated by a substantially equal distance $D_1$. In an alternative embodiment, cells 60 are separated by variable distances, and/or cells 60 are oriented in a non-symmetrical arrangement.

More specifically, in the exemplary embodiment, cells 60 have a smaller cross-sectional area and define a smaller volume than cells 62. It should be noted that the size, height, volume, number, orientation, and location of cells 14 within arrangement 58, and relative to cushion 10, are each variably selected, as described in more detail below, based on the intended use or application of cushion 10, and to enable cushion 10 to function as described herein. Moreover, the dimensions of cushion 10 and of cells 14 are variably selected to accommodate a variety of human body sizes. In the exemplary embodiment, cells 62 are positioned generally between cells 60 and cushion sides 20 and 22, and cells 60 are arranged in a plurality of rows 64. In an alternative embodiment, cells 60 are not arranged in rows 64. Rows 64 extend substantially across base 12 between sides 20 and 22, and substantially between forward and rear sides 16 and 18, respectively. In an alternative embodiment, cells 60 and 62 are arranged in other geometric configurations 58 relative to cushion 10.

In the exemplary embodiment, small cells 60 are each substantially cylindrical and each respective small cell body portion 50 has a substantially circular cross-sectional area. As such, each cell 60 has the same diameter $D_2$. In an alternative embodiment, a plurality of different-sized cells 60 extend from base 12. In a further alternative embodiment, cells 60 may be non-cylindrical and/or have a non-circular cross-sectional profile. In another alternative embodiment, cushion 10 does not include any cells 60 and/or any cells having a substantially circular cross-sectional profile. More specifically, in the exemplary embodiment, within arrangement 58, a plurality of small cells 60 (identified for more clarity in the Figures as 80) are oriented such that their outer surface 52 is substantially planar and is aligned substantially parallel to base upper surface 54, and a plurality of small cells 60 (identified for more clarity in the Figures as 82) are oriented such that their generally planar outer surface 52 is obliquely aligned with respect to base upper surface 54. In an alternative embodiment, an outer surface 52 of each cell 60 is non-planar and/or is obliquely aligned with respect to base upper surface 54.

More specifically, within arrangement 58, at least some of cells 82 (identified for more clarity in the Figures as cells 90) are oriented such that outer surface 52 is sloped towards a centerline 92 extending through cushion 10 from forward side 16 to rear side 18, and at least some of cells 82 (identified for more clarity in the Figures as cells 94) are oriented such that outer surface 52 is sloped away from centerline 92. Moreover, in the exemplary embodiment, within arrangement 58 a height H of small cells 60 varies across cushion 10.

In the exemplary embodiment, cells 62 are positioned between cells 60 and cushion sides 20 and 22, and have a generally larger cross-sectional area than cells 60. More specifically, in the exemplary embodiment, cushion 10 includes four cells 62 which are space along rear side 18 from elbow 24 to elbow 26. In the exemplary embodiment, cells 62 are tri-lobe shaped and have an outer surface 52 that is slightly sloped towards centerline 92.

Within arrangement 58, cushion cells 14 are oriented and spaced across cushion 10 to facilitate proving support to a seated user. Moreover, because the cell heights H are varied across cushion 10, and because of the various sizes of cells 14, cell outer surfaces 52 define a contoured seating surface 100 upon which the user sits and which is generally in conformance with the shape of the user's buttocks. Moreover, the cell height H, arrangement 58, and the dimensions of cushion 10, cells 14, and arrangement 58 are variably selected to accommodate a variety of human body sizes and differences in user body contours. For example, in the exemplary embodiment, the orientation of cells 60 and 62 within arrangement 58 enables a plurality of depressions 102 to be defined within surface 100. More specifically, in the exemplary embodiment, the orientation of cells 60 and 62 define ischial support areas 103, a trochanter area 104, a coccyx relief area 105, and a genital relief area 106.

When cushion 10 is in use by a seated user, the air-filled cells 14 deform under the user's weight to substantially equalize the forces induced to the user. When cushion 10 is in use by a seated user, cells 14 deform under the user's weight to substantially equalize the forces induced to the user Generally, the combination of the orientation of cell outer surfaces 52 with respect to base 12 and ischial support area 102 allows the seated user to settle further into cushion 10 such that the user's buttocks are cradled and such that the user's weight is facilitated to be more evenly distributed across cushion 10. Moreover, because ischial support area 102 is designed to be substantially centered beneath the seated user's ischial area, cells 14 within ischial support area 102 facilitate damping vibrational stresses induced to the user's ischial area. Furthermore, the orientation of cell outer surfaces 52 with respect to base 12 allows the user's thighs to extend over the forward edge 16 of cushion 10 with optimal comfort. As a result, the sitting support provided to the seated operator is facilitated to be increased.

In the exemplary embodiment, cells 14 across cushion are not all coupled together in fluid flow communication, but rather, within arrangement 58 cells 14 are defined into regions 108 of cells 14 that are coupled together in fluid flow communication with each other, as described in more detail below. More specifically, in the exemplary embodiment, arrangement 58 includes two regions 108: a first region 110 and a second region 112 (shown in the Figures for more clarity as separated by a line R). In alternative embodiments, cushion 10 includes more or less than two regions 108. As a result of the segmented air flow within cushion 10, the stability provided to the seated operator is facilitated to be increased.

In the exemplary embodiment, each region 108 includes a plurality of cells 60 and 62 that are coupled together in flow communication with only those cells 14 positioned within that particular region 110 or 112. Accordingly, each region 108 includes at least one inflation/deflation valve 114 that extends from base 12. Valves 114 may be selectively opened and closed to enable fluid to be injected into, or discharged from, cells 14 within the region 108. It should be noted that other valving arrangements are possible. In the exemplary embodiment, the working fluid supplied cells 14 is air. In an alternative embodiment, the working fluid is any fluid that enables cushion 10 to function as described herein, including, but not limited to, other gases, fluids, or liquids. Accordingly, in the exemplary embodiment, because cells 14 are coupled together in flow communication within each specific region 110 or 112, when cells 14 are initially inflated, cells 14 within each specific region 110 or 112 are each pressurized to approximately the same fluid pressure.

In the exemplary embodiment, conformal layer 42 is formed integrally with cells 14 using a conventional dip molding process. Alternatively, conformal layer 42 may be formed using a vacuum molding process or an injection molding process. In an alternative embodiment, injection molded cells 14 are coupled to layer 42 using a known coupling method, such as, but not limited to radio frequency (RE) welding.

In one embodiment, a cover (not shown) fits over cushion 10. The cover provides an aesthetically pleasing seating surface that facilitates protecting cellular cushion 10 and maintaining cells 14 in proper position relative to base 12. As such, the cover facilitates reducing and redistributing pressure to the user from pressure points in the ischial regions, and also provides the user with an enhanced sense of stability.

The above-described cellular cushions provide a user with a sitting surface that facilitates increasing stability and comfort to the user. More specifically, the cellular cushions each include a conformal layer that includes a plurality of cells extending therefrom, wherein each cell extending from the conformal layer is coupled in flow communication with every other cell extending from the conformal within its region. The cell dimensions enable a contoured seating surface to be defined that cradles the seated user and enhances the stability provided to the seated user. As a result, a cellular cushion is provided which facilitates increasing the sitting support and stability provided to a seated user in a cost-effective and reliable manner.

Exemplary embodiments of cellular cushions are described above in detail. Although the cellular cushions are herein described and illustrated in association with seated users, it should be understood that the present invention may be used to provide cushioning in a plurality of other uses. Moreover, it should also be noted that the components of each cellular cushion are not limited to the specific embodiments described herein, but rather, aspects of each cushion and fabrication method may be utilized independently and separately from other methods described herein.

While the invention has been described in terms of various specific embodiments, those skilled in the art will recognize that the invention can be practiced with modification within the spirit and scope of the claims.

What is claimed is:

1. A cellular cushion comprising:
   a base comprising at least a first layer and a second layer, said first layer comprises a substantially planar lower surface and an upper surface that is opposite said lower surface, said second layer comprises a substantially planar lower surface and a substantially planar upper surface that is opposite said second layer lower surface; and
   a plurality of hollow cells coupled to said base and extending outwardly from said first layer upper surface within at least one region, each of said plurality of cells within each said region are coupled together in flow communication, each of said plurality of cells comprises a hollow body portion and an outer surface, said plurality of cells are spaced across said base such that said plurality of cell outer surfaces cooperate to define a contoured seat, at least one of said plurality of cell outer surfaces is oriented obliquely in a first direction and at least one of said plurality of cell outer surfaces is oriented obliquely in a second direction that is different from the first direction, at least one of said plurality of cells having an outer surface oriented only in the first direction and at least one of said plurality of cells having an outer surface oriented only in the second direction, the contoured seat is configured to cradle a portion of a user, an outer surface of at least some of said plurality of cells is at least one of oriented obliquely with respect to said base and is non-planar.

2. A cellular cushion in accordance with claim 1 wherein said plurality of hollow cells further comprise a plurality of first cells and a plurality second cells, said plurality of first cells each have a first cross-sectional area, said plurality of second cells each have a second cross-sectional area that is different than said first cross-sectional area.

3. A cellular cushion in accordance with claim 2 wherein said first cross-sectional area of each of said plurality of first cells is larger than said second cross-sectional area of each of said plurality of second cells.

4. A cellular cushion in accordance with claim 2 wherein said plurality of first cells each have a cross-sectional shape that is different than a cross-sectional shape of each of said plurality of second cells.

5. A cellular cushion in accordance with claim 1 wherein said at least one region comprises at least a first region and a second region, said plurality of cells within said first region are coupled together in flow communication with only other of said cells within said first region, said plurality of cells within said second region are coupled together in flow communication with only other of said cells within said second region.

6. A cellular cushion in accordance with claim 5 wherein an operating pressure within said plurality of cells in said first region is controllable independently of an operating pressure within said plurality of cells in said second region.

7. A cellular cushion in accordance with claim 1 wherein each of said plurality of hollow cells has a height measured from said first layer upper surface to said cell outer surface, said cell height is variable within said at least one region.

8. A cellular cushion in accordance with claim 1 wherein at least some of said plurality of cell outer surfaces are sloped in a first direction and wherein at least some of said plurality of cell outer surfaces are sloped in a second direction that is opposite said first direction.

9. A cellular cushion in accordance with claim 1 wherein said at least some of said plurality of cell outer surfaces are sloped towards a centerline of said cushion, and wherein at least some of said plurality of cell outer surfaces are sloped away from said cushion centerline.

10. A cellular cushion comprising:
a base comprising at least a first region and a second region, said base further comprising a substantially planar lower surface and a substantially planar upper surface that is opposite said lower surface;
a plurality of first hollow cells extending outward from said base within said first region; and
a plurality of second hollow cells extending outward from said base within said second region, said plurality of first hollow cells in said first region are coupled together in flow communication independently of said plurality of second hollow cells within said second region, each of said first and second hollow cells comprises a hollow body portion extending from said base to an outer surface, at least some of said cell outer surfaces are oriented obliquely with respect to said base and are sloped in a first direction, at least some of said cell outer surfaces are oriented obliquely with respect to said base and are sloped in a second direction that is substantially opposite said first direction, at least one of said plurality of cells having an outer surface that is oriented in only the first direction and oriented in both the first direction and substantially parallel to said base, at least one of said cell outer surfaces comprising a planar portion and an oblique portion that extends obliquely from the planar portion, said planar portion is substantially parallel to said base upper surface.

11. A cellular cushion in accordance with claim 10 wherein at least some of said plurality of cells within said first and second regions further comprise a first plurality of cells having a first cross-sectional area and a second plurality of cells having a second cross-sectional area.

12. A cellular cushion in accordance with claim 10 wherein at least some of said plurality of cells within said first and second regions further comprise a first plurality of cells having a first cross-sectional shape and a second plurality of cells having a second cross-sectional shape.

13. A cellular cushion in accordance with claim 10 wherein said outer surfaces of said plurality of first and second hollow cells define a contoured surface configured to cradle a portion of a user's buttocks seated thereon.

14. A cellular cushion in accordance with claim 10 wherein said cushion is symmetrical about an centerline axis of symmetry, said plurality of first hollow cells within said first region are oriented in a substantially mirrored relationship with respect to said plurality of second hollow cells within said second region.

15. A cellular cushion in accordance with claim 10 wherein each of said plurality of first hollow cells and said plurality of second hollow cells has a height measured from said base to said cell outer surface, said plurality of cell heights vary within at least one of said first region and said second region.

16. A cellular cushion in accordance with claim 10 wherein said base comprises a plurality of layers coupled together.

17. A cellular cushion comprising:
a base comprising at least a first layer and a second layer, said first layer comprises a substantially planar lower surface and an upper surface that is opposite said lower surface, said second layer comprises a substantially planar lower surface and a substantially planar upper surface that is opposite said second layer lower surface; and
a plurality of hollow cells coupled to said base and extending outwardly from said first layer upper surface within at least one region, each of said plurality of cells within each said at least one region are coupled together in flow communication only with cells within said at least one region, each of said plurality of cells comprises a hollow body portion and an outer surface, said plurality of cells are spaced across said base such that said plurality of cell outer surfaces cooperate to define a contoured seat, at least one of said plurality of cell outer surfaces is oriented obliquely in a first direction and at least one of said plurality of cell outer surfaces is oriented obliquely in a second direction that is different than the first direction, at least one of said plurality of cells having outer surfaces oriented only in the first direction and at least one of said plurality of cells having outer surfaces oriented only in the second direction, the contoured seat is configured to cradle a portion of a user, an outer surface of at least some of said plurality of cells is at least one of oriented obliquely with respect to said base and is non-planar, at least some of said plurality of cell outer surfaces are sloped in a first direction and at least some of said plurality of cell outer surfaces are sloped in a second direction that is opposite said first direction, at least some of said hollow cells in said at least one region have a non-circular cross-sectional profile.

* * * * *